US005941547A

United States Patent [19]

Drake

[11] Patent Number: 5,941,547

[45] Date of Patent: Aug. 24, 1999

[54] MANUALLY PROPELLED WHEELCHAIR DEVICE

[76] Inventor: Carl F. Drake, 102 Strand, No. 12, Galveston, Tex. 77550

[21] Appl. No.: 08/585,096

[22] Filed: Jan. 16, 1996

[51] Int. Cl.[6] ........ B62M 1/14

[52] U.S. Cl. ........ 280/243; 280/242.1; 280/250.1

[58] Field of Search ........ 280/242.1, 243, 280/251, 244, 246, 250.1, 255, 264, 253

[56] References Cited

U.S. PATENT DOCUMENTS

| | | | |
|---|---|---|---|
| 4,453,729 | 6/1984 | Lucken | 280/250.1 |
| 4,560,181 | 12/1985 | Herron | 280/250.1 |
| 4,583,754 | 4/1986 | Seeliger | 280/264 |
| 4,652,026 | 3/1987 | Byrge . | |
| 4,667,975 | 5/1987 | Fabiano | 280/264 |
| 4,735,431 | 4/1988 | Tait | 280/250.1 |
| 4,762,332 | 8/1988 | Seol | 280/250.1 |
| 4,811,964 | 3/1989 | Horn | 280/250.1 |
| 4,865,344 | 9/1989 | Romero, Sr. et al. . | |
| 4,993,732 | 2/1991 | Wedemeyer | 280/250.1 |
| 5,242,179 | 9/1993 | Beddome | 280/250.1 |
| 5,297,810 | 3/1994 | Lukyanov . | |
| 5,413,367 | 5/1995 | Ochiai | 280/250.1 |

*Primary Examiner*—Christopher P. Ellis
*Assistant Examiner*—R. B. Johnson
*Attorney, Agent, or Firm*—Browning Bushman

[57] ABSTRACT

A manually propelled wheelchair (10) powered by the chair occupant. Hand power levers (11,12) are pivoted on each side of the chair frame (15). Drive cables (25) connect each lever to a wheel pulley (20) which in turn acts through one-way clutches to propel the wheels (16, 17) during the power stroke as the lever pulls the drive cable. The clutches permit free wheeling of the chair except during the application of drive power. Recoil springs (46) rewind the cable on the pulley during the lever's return stroke. The point of cable attachment (19) to the lever is changed by rotating the lever handle (21) to change the ratio of lever movement to wheel movement. Moving the attachment point below the pivot point reverses the direction of the power and the return strokes. Directional control is obtained by differential application of power to the wheels and by selective wheel braking. For single hand operation, a single axle is used for both wheels. Directional control is provided by differential wheel braking with brake control levers for each wheel mounted on the single hand power lever.

4 Claims, 2 Drawing Sheets

MANUALLY PROPELLED WHEELCHAIR DEVICE

BACKGROUND OF THE INVENTION

The present invention relates generally to the field of manually powered vehicles. More specifically, the present invention relates to wheelchairs in which the wheelchair user supplies hand power to propel the chair.

In a typical manually powered wheelchair, the seated chair occupant grasps large wheels on the chair and rotates the wheels in the desired direction of chair movement Circular hand grips are usually attached to the outside of the large wheels to facilitate the procedure. This procedure requires a downward and forward arm movement that tends to lift and push the operator against the back of the seat preventing the operator's full arm strength from being transferred to the wheels.

Manually self-propelled wheelchairs have typically required the use of large wheels to provide the mechanical advantage necessary to convert occupant power to propulsion and to help move the chair over irregular surfaces. The center of gravity of an occupied wheelchair having such large wheels is high and forward of the chair's rear pivotal axis about the large wheels. The downward and forward forces required in manually rotating the wheels tend to move the center of gravity of the occupied chair higher and in a direction that would place the center of gravity behind the pivotal axis thus making the chair less stable. When the self powered movement is up a sloping surface or over abrupt surface obstructions, the center of gravity of the occupied chair can easily move behind the pivotal axis of the chair causing it to tip backwards. The result, again, is that maximum available manual power cannot be effectively transmitted to the wheels when advancing the chair up a slope or attempting to roll over large surface obstructions.

BRIEF DESCRIPTION OF THE INVENTION

A hand-powered wheelchair drive system is provided to permit the wheelchair occupant operator to propel and steer the wheelchair without adversely shifting the center of gravity of the operator and chair. Propulsion is effected by back and forth pulling and pushing strokes of one or more hand levers that are pivotably connected to the frame of the chair. Movement of the levers supplies power to the wheels in either the pulling or the pushing stroke. The return stroke, in either case, does not power the wheels.

The arm movements required to manipulate the hand levers produce fore and aft forces in the operators' body that are restrained by chair back or seatbelt forces in the chair. Since these forces do not tend to lift the operator, the center of gravity of the combined chair and operator is not raised. The result is a more stable propulsion system as compared with conventional direct hand operated wheel rotation.

In a preferred embodiment of the invention, the large drive wheels of the chair are equipped with mountain bike tires to permit scaling of steps and other surface obstacles.

An important feature of the present invention is that the chair structure counteracts the operator's hand forces so that a strong operator can impart force to the lever in excess of the operator's weight. By contrast, forces exerted by the user of a conventional chair tend to lift the user out of the wheelchair seat thereby limiting the force applied to propel the chair. Even when the user is strapped in, the mechanics of pushing down and forward on the wheels of a conventional wheelchair limit the amount of force that the body can impart to the wheel. The positioning of the hand levers of the present invention permits the user to push or pull the handle in normal arm movements, which further assists in the application of maximum driving force from the arms.

In the system of the present invention, the movement of the hand lever is transmitted to the wheelchair wheels through a flexible metal cable that acts through a one-way clutch drive to rotate the wheel. Provision is made for changing the power transfer of the hand lever movements whereby the ratio of lever movement to wheel movement is changed by rotating the handle section of the power lever, which changes the point at which the cable attaches to the lever. With the attachment point close to the lever's pivot point, a relatively long lever stroke produces a relatively small amount of wheel turn. The result is that the wheel turn occurs with greater power. By comparison, when the cable attachment point is farther away from the lever pivot point, the lever produces more wheel turn for the same amount of lever movement. In the latter case, wheel power is traded for an increase in wheel speed. The control for changing the cable attachment point forms a part of the hand lever itself, which allows the operator to change the power conversion ratio without having to remove a hand from the lever.

Unlike more complicated reduction gearing systems, the mechanism for changing the power conversion ratio of the present invention is extremely simple and permits a continuous range of lever movement to wheel movement ratios over the full extent of the lever's power stroke.

The mechanism for changing the power conversion also provides a means for reversing the direction of the power stroke so that the powering movement may be a pulling action rather than a pushing motion, or vice versa. Thus, with the cable attachment point above the pivot point, the lever is pushed to produce wheel movement. Placing the cable attachment point below the lever pivot point produces wheel movement when the lever is pulled. In either configuration, the system conveys movement to the wheel at a ratio determined by the distance of the cable attachment point from the lever pivot point.

An important feature of the drive system of the present invention is the provision of a one-way clutch mechanism that operatively connects the wheel to the propulsion system only when the system is delivering power to the wheel. At all other times, the wheel turns freely, independently of the lever movement. The result is that the chair may freely roll forward or backwards when power is not being delivered to the wheels by lever movement.

In the form of the chair designed for one hand operation, a single lever is employed to drive both large wheels by powering a common axle. Differential braking of the two driven wheels steers the wheelchair. Dual brake controls and the power ratio handle section are all mounted on the same lever so that all steering and powering can be performed with only a single hand.

In a preferred embodiment, hydraulic brakes are employed to control wheel rotation in either the two hand or single hand propulsion systems.

The two lever system that is used to independently power both large wheels may also be employed on a conventional collapsible folding chair.

From the foregoing it will be appreciated that the manually propelled wheelchair system of the present invention permits the operator to apply a maximum of arm strength to power the system without adversely affecting the stability of the chair.

Another object of the invention is to provide a hand operated self propulsion system that may be adapted to the physical limitations and strength of the user and that will not force the chair and user into unstable positions during the application of manual power to the main wheels.

It is another object of the invention to provide a self propulsion system that may be added to existing wheelchairs without significant modification of the chair.

Other objects of the invention are to provide a relatively inexpensive propulsion system that may be adapted for use on a conventional wheelchair for self powered, manual operation that also provides an adjustable power transfer mechanism for changing the ratio of hand movement to wheel rotation.

Still another object of the present invention is to provide a hand operated, self powered wheel chair that allows the operator occupant to be positioned in the chair in a manner to provide a low center of gravity for the operator and chair while simultaneously enabling the occupant to exert the maximum possible driving force on the hand powering mechanism.

These and further objects, features and advantages of the present invention will become apparent from the following detailed description, wherein reference is made to the figures in the accompanying drawings.

DESCRIPTION OF THE PREFERRED EMBODIMENTS

Figure 1:
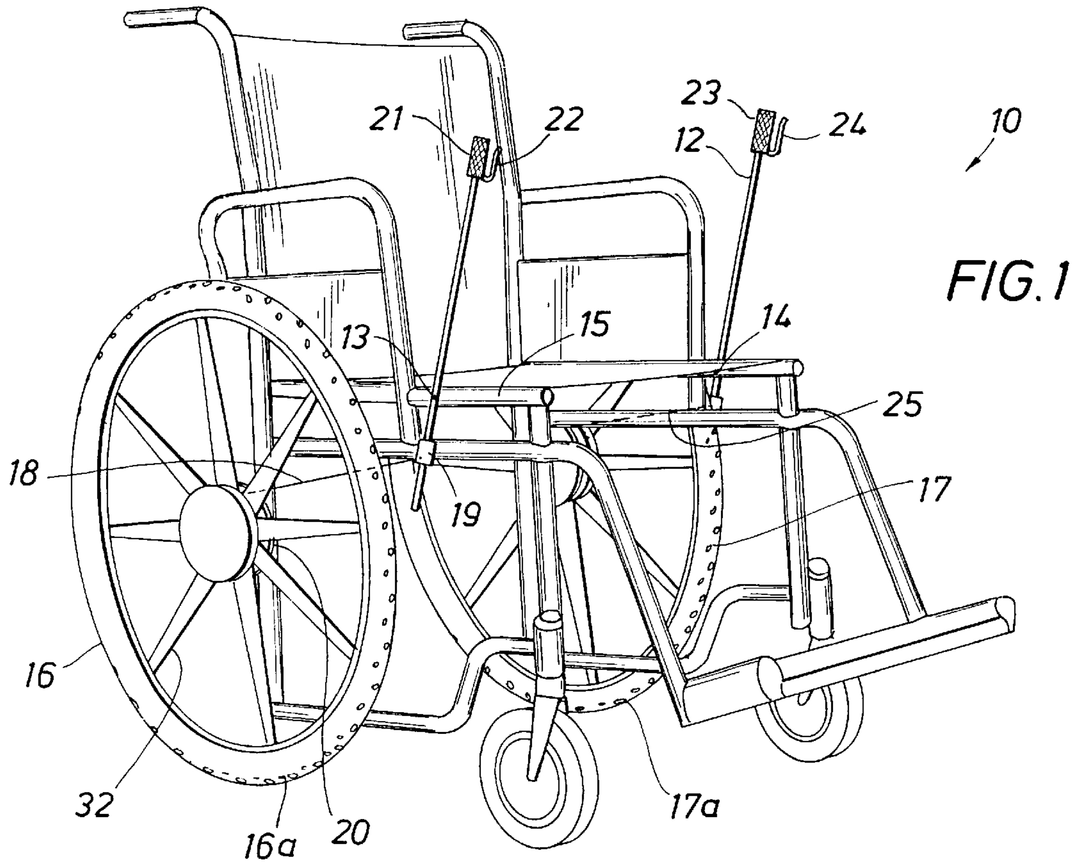
FIG. 1 is vertical elevation, in perspective, illustrating a conventional wheelchair equipped with the hand powered, self propulsion system of the present invention.

FIG. 1 illustrates a wheelchair indicated generally at 10 equipped with a hand operated, self propulsion system of the present invention. The chair 10 is provided with power levers 11 and 12 that are connected at pivot points 13 and 14 respectively to the frame 15 of the chair.

The levers 11 and 12 power similar drive linkages that connect respectively with large wheels 16 and 17. The wheels 16 and 17 are preferably equipped with rubber tires 16 and 17, respectively, having specially contoured traction threads such as found on mountain bikes. The linkage connecting the lever 11 and the wheel 16 includes a flexible, steel cable 18 that extends from a moveable attachment connection 19 on the lever 11 to a drive pulley 20 at the hub of the wheel 16. A similar linkage connects the lever 12 with the hub of the wheel 17. The use of a cable 18 provides an easily adjustable linkage that may be sized to fit a wide range of wheelchair designs.

The top of the lever 11 is equipped with a rotatable handle 21 that is rotated to move the attachment connector 19 up or down along the length of the lever. A brake control lever 22 is also carried at the upper end of the lever 11 within finger reach of a hand on the handle 21. A similar control handle 23 and brake control 24 are provided on the lever 12. A flexible cable 25 extends between the attachment connector and the wheel hub (not visible) on the chair's left-hand drive assembly. In all related aspects, the drive for the left-hand wheel 17 and that of the right-hand wheel 16 are identical, in a symmetrical arrangement, and will be described in detail with reference to the right-hand drive assembly.

Figure 2:
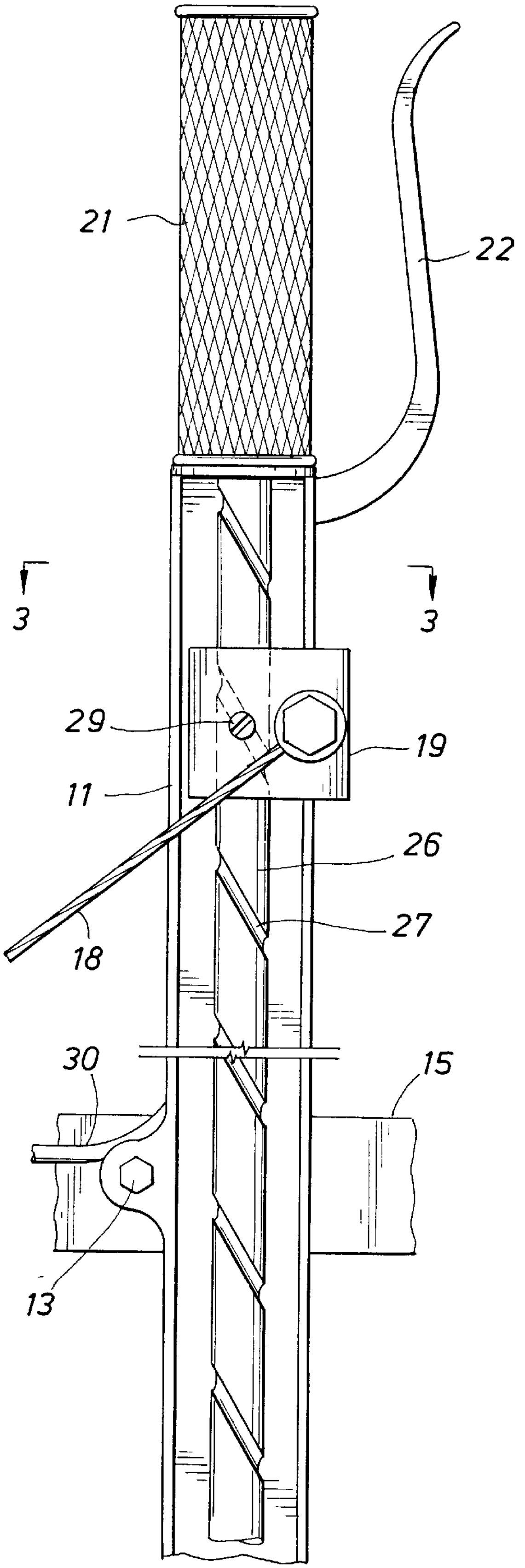
FIG. 2 is a partial vertical elevation illustrating details in the construction of the power lever of the present invention.
Figure 3:
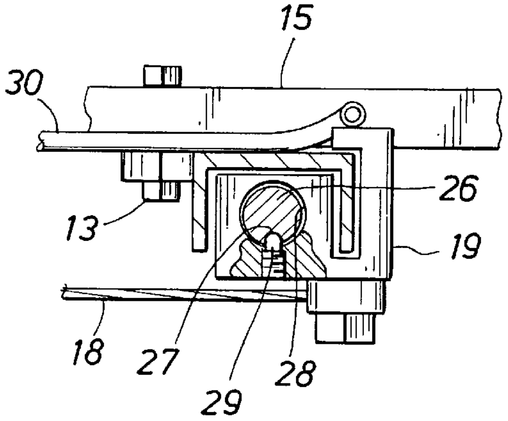
FIG. 3 is a horizontal cross-section taken along the line 3—3 of FIG. 2 illustrating the moveable attachment mechanism of the present invention.

FIGS. 2 and 3 illustrate details in the operation of the power lever 11. As illustrated by joint reference to FIGS. 2 and 3, the lever 11 has a generally U-shaped cross-section within which is disposed an elongate shaft 26 provided with an external helical groove 27. The attachment connector 19 has a central opening 28 through which the shaft 26 extends. A pin 29 extending through the side of the connector 19 projects through the opening 28 and into the helical groove 27. The connector 19 is configured to slidingly mate with one side of the lever 11 to hold the connector in position on the lever. In operation, rotation of the handle 21 rotates the shaft 26 causing the pin 29 to move through the groove 27. This motion moves the connector 19 up or down the lever 11 depending on the direction of rotation of the handle 21.

The hydraulic brake of the wheelchair assembly is activated by pulling the finger lever 22 toward the handle 21. This movement of the lever 22 pressurizes hydraulic fluid in a fluid line 30 to operate disk brakes on the wheel 16 in a conventional manner.

Power is applied to the wheel 16 through the lever 11 by the operator who uses arm motion to move the lever back and forth about the pivot point 13. This motion alternately either pulls or permits retraction of the cable 18. When the cable is pulled, a power stroke occurs that acts through the cable 18 to rotate the drive pulley 20 in a clockwise direction. This movement of the pulley 20 is conveyed to the hub of the wheel 16 through a one-way acting clutch mechanism illustrated generally at 31 in FIG. 4. Rotation of the hub of the wheel 16 is transmitted by spokes 32 to the wheel tire. When climbing stairs, or other obstructions, the handles 21 and 23 of the levers 11 and 12 are rotated to bring the connectors 29 as close to the pivot points 14 and 19 as necessary to provide the required power.

Figure 4:
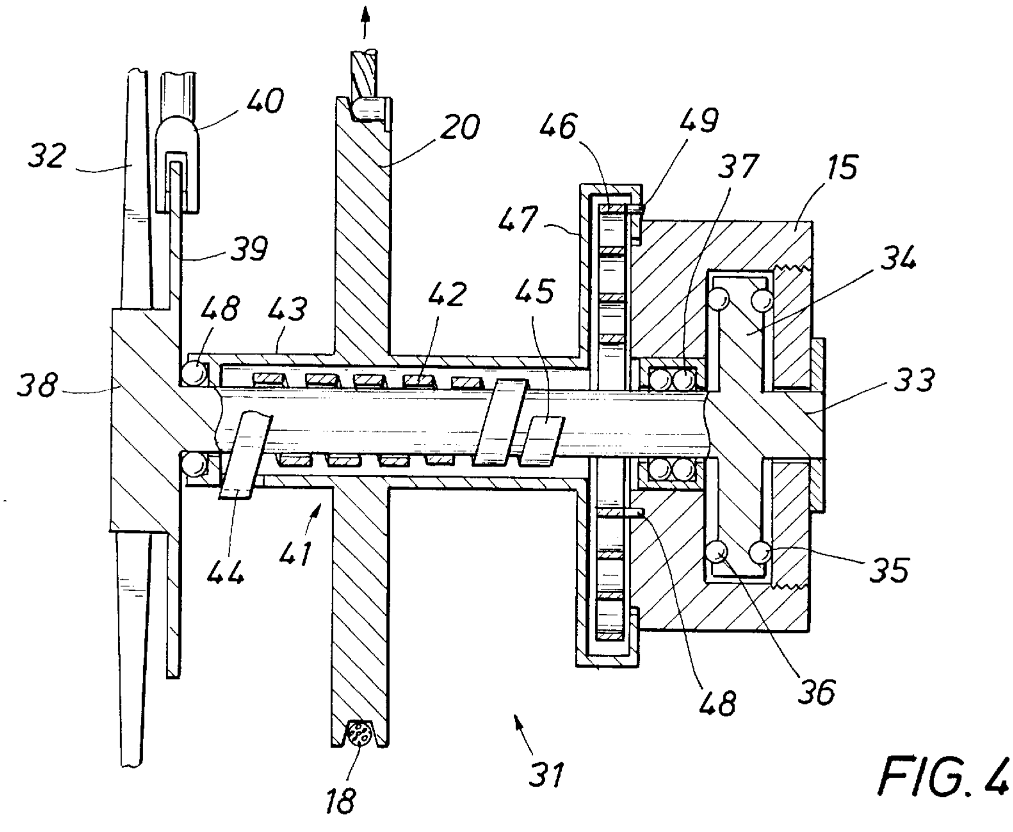
FIG. 4 is a partial vertical section illustrating details in the construction and operation of the one-way clutch drive of the present invention.

FIG. 4 illustrates a single wheel drive assembly of the present invention that includes an axle 33 rotatably mounted in the frame 15. A circular bearing plate 34 at one end of the axle 33 cooperates with ball bearings 35, 36 and 37 to secure the axle against axial and lateral movement while permitting axle rotation within the mounting of the frame 15.

The outside axle end is equipped with a hub 38 that supports the wheel spokes 32 of the wheel 16. A circular disk 39 connected with the hub 38 is engaged by brake pads in a brake caliper 40 in a conventional manner, to provide wheel braking. It will be understood that the caliper 40 is fixed to the frame 15 so that engagement of the brake pads in the calipers 40 against the disk 39 will stop rotation of the wheel 16 relative to the frame 15.

The one-way clutch drive 31 employs a torsion spring clutch 41 for imparting rotating power to the axle 33. The clutch 41 is formed by a flat, steel helical spring 42 that closely surrounds the axle 33. A sleeve housing 43 surrounds the spring 42. The spring 42 is attached at its end 44 to the housing 43. The opposite end 45 of the spring is free to ride against the axle 33.

A return coil spring 46 is carried within a return spring housing 47. The spring 46 has its inner end 48 connected to the frame 15 and its outer end 49 connected to the housing 47.

The spring 46 is wound during the clockwise powered rotation of the drive pulley 20. On the return stroke of the hand lever, the spring 46 unwinds to turn the pulley counterclockwise to its starting position.

A bearing assembly 48 separates the housing 43 from the wheel hub 38 to permit relative movement between the two components.

In operation, the cable 18 pulls the drive pulley 20 in a clockwise direction during the power stroke of the lever 11. The pulley rotation is transferred to the housing 43. Frictional contact between the axle 33 and the spring 42 tends to decrease the spring diameter causing it to grip the axle. So long as power is being applied by the drive pulley, the axle movement resists the spring movement causing the gripping force of the spring 42 to increase. Through this mechanism, clockwise rotation of the drive pulley 20 causes clockwise rotation of the axle 33 and attached wheel 16.

When the drive pulley stops its clockwise rotation, the continued rotation of the axle 33 acts through its frictional engagement with the spring 42 to increase the spring diameter, which releases the axle for movement relative to the spring. The result is that the axle 33 and wheel 16 are automatically freed to rotate independently of the one-way clutch drive 41 any time power is not being applied to the axle. No additional release means is required to permit free rolling movement of the chair in any direction.

While the preferred form of the present invention has been described with a torsion spring clutch 41, it will be appreciated by those skilled in the art that other mechanisms such as a needle roller or needle shaft clutch may be employed to obtain the desired one-way drive motion.

The foregoing disclosure and description of the invention is illustrative and explanatory thereof. It will be appreciated by those skilled in the art that various changes in the size, shape and materials as well as in the details of the illustrated construction or combinations of features may be made without departing from the spirit of the invention. For example, the power transmission and drive system of the present invention may be employed in a vehicle with a very low center of gravity and specially treaded rubber tires that will permit scaling stairs and steep ramps.

What is claimed is:

1. A manually propelled vehicle comprising:

a frame, a first lever pivot point structure mounted on said frame, a first lever pivotally mounted on said first pivot point structure, a plurality of wheels mounted on said frame to facilitate the movement of said frame on a supporting surface, at least one of said wheels defining a first rotatable drive wheel;

a first drive linkage operatively connecting said first lever and said first drive wheel for converting pivotal movement of said first lever about said first pivot point structure to rotary movement of said first drive wheel to propel said frame;

a first clutch connected to said first drive wheel and said first drive linkage to transmit selected pivotal movement of said first lever to produce rotary movement of said first drive wheel;

a first attachment member movably mounted on said first lever for attaching said first drive linkage to said first lever;

a first force conversion mechanism for moving said first attachment member on said first lever to change the location of the connection of said first drive linkage on said first lever to change the ratio of pivotal movement of said first lever to said rotary movement of said first drive wheel; and said first farce conversion mechanism including a first elongated shaft mounted on said first lever, first means for guiding the movement of said first attachment member along said first elongated shaft, said first elongated shaft being of a length to extend above and below said first pivot point structure, and a first handle mounted on said first lever for moving said first attachment member along said first elongated shaft to a plurality of positions above and below said first pivot point structure of said first lever.

2. A manually propelled vehicle as defined in claim 1 wherein said first elongated shaft is rotatable by said first handle for rotating said first elongated shaft for moving said first attachment member along said first elongated shaft.

3. A manually propelled vehicle as defined in claim 1 wherein said first clutch includes a one-way acting release mechanism for permitting said first drive wheel to functionally disengage said first drive link-age when said first drive linkage is not converting first lever movement to rotary movement of said first drive wheel.

4. A manually propelled vehicle as defined in claim 1, further comprising:

a second lever pivot point structure mounted on said frame, a second lever pivotally mounted on said second pivot point structure, a second rotatable drive wheel and a second drive linkage operatively connecting said second lever and said second drive wheel for converting pivotal movement of said second lever about said second pivot point structure to rotary movement of said second drive wheel.

* * * * *

UNITED STATES PATENT AND TRADEMARK OFFICE
CERTIFICATE OF CORRECTION

PATENT NO. : 5,941,547
DATED : August 24, 1999
INVENTOR(S) : Carl F. Drake

It is certified that error appears in the above-identified patent and that said Letters Patent is hereby corrected as shown below:

In column 6, line 15, delete "farce" and insert therefor --force--.

In column 6, line 33, delete "link-age" and insert therefor --linkage--.

Signed and Sealed this

Seventh Day of March, 2000

Attest:

Q. TODD DICKINSON

Attesting Officer

*Commissioner of Patents and Trademarks*